US008819359B2

United States Patent
Kapil et al.

(10) Patent No.: US 8,819,359 B2
(45) Date of Patent: Aug. 26, 2014

(54) HYBRID INTERLEAVING IN MEMORY MODULES BY INTERLEAVING PHYSICAL ADDRESSES FOR A PAGE ACROSS RANKS IN A MEMORY MODULE

(75) Inventors: Sanjiv Kapil, Cupertino, CA (US); Blake Alan Jones, Oakland, CA (US)

(73) Assignee: Oracle America, Inc., Redwood Shores, CA (US)

(*) Notice: Subject to any disclaimer, the term of this patent is extended or adjusted under 35 U.S.C. 154(b) by 1102 days.

(21) Appl. No.: 12/493,455

(22) Filed: Jun. 29, 2009

(65) Prior Publication Data
US 2010/0332775 A1  Dec. 30, 2010

(51) Int. Cl.
*G06F 12/00* (2006.01)
*G06F 13/00* (2006.01)
*G06F 13/28* (2006.01)
*G11C 8/00* (2006.01)
*G06F 9/26* (2006.01)
*G06F 9/34* (2006.01)
*G06F 12/06* (2006.01)

(52) U.S. Cl.
CPC .................................. *G06F 12/0607* (2013.01)
USPC ............... 711/157; 711/5; 711/127; 711/202; 711/206; 711/207; 365/230.03; 365/230.04

(58) Field of Classification Search
None
See application file for complete search history.

(56) References Cited

U.S. PATENT DOCUMENTS

| 6,049,855 | A | * | 4/2000 | Jeddeloh | 711/157 |
| 7,266,651 | B1 | * | 9/2007 | Cypher | 711/157 |
| 7,398,362 | B1 | * | 7/2008 | Tischler | 711/157 |
| 7,779,198 | B2 | * | 8/2010 | Hutson | 711/5 |
| 2007/0011421 | A1 | * | 1/2007 | Keller et al. | 711/165 |
| 2008/0005516 | A1 | * | 1/2008 | Meinschein et al. | 711/165 |

* cited by examiner

*Primary Examiner* — Sanjiv Shah
*Assistant Examiner* — Marwan Ayash
(74) *Attorney, Agent, or Firm* — Park, Vaughan, Fleming & Dowler LLP; Steven E. Stupp

(57) ABSTRACT

A memory system that interleaves storage of data across and within a plurality memory modules is described. The memory system includes a hybrid interleaving mechanism which maps physical addresses to locations within memory modules and ranks so that physical addresses for a given page all map to the same memory module, and physical addresses for the given page are interleaved across the plurality of ranks which comprise the same memory module.

20 Claims, 5 Drawing Sheets

HYBRID INTERLEAVING IN MEMORY MODULES BY INTERLEAVING PHYSICAL ADDRESSES FOR A PAGE ACROSS RANKS IN A MEMORY MODULE

BACKGROUND

1. Field

The present disclosure relates to techniques for storing data in memory modules, and more specifically, interleaving data across memory modules.

2. Related Art

In order to compensate for the relatively low bandwidth provided by certain types of memory, such as DRAM, many computer systems include interleaved memories. In such memories, data is distributed across multiple memory modules, which enables the computer system to subsequently access the data from multiple memory modules in parallel, thereby increasing memory-system throughput. For example, data can be distributed between the memory modules and within the memory modules based on lower-order physical address bits, which results in a fine-grained interleaving of the data between ranks and memory modules.

However, in computer systems that use interleaving, it is often difficult to transition one or more ranks and/or one or more memory modules to an off-line low-power mode without adversely impacting performance. For example, given a page size of 4 or 8 KB, interleaving data based on lower-order physical address bits typically results in portions of each page being distributed to multiple memory modules. Hence, if one of these memory modules is off-lined, a hole is created in the address space within a physical page which can cause the system to crash.

One solution to this problem is to interleave the data across the ranks and/or the memory modules based on higher-order physical address bits. While this interleaving technique can align the physical pages with different memory modules, thereby allowing portions of memory to be off-lined without creating a hole in a physical page, the resulting interleaving is coarse, which reduces parallelism that can be employed while accessing a page. Consequently, there is a tradeoff between performance and power management in such interleaved memory systems.

SUMMARY

One embodiment of the present disclosure provides a memory system having a plurality of memory modules. Each memory module in the plurality of memory modules includes a plurality of ranks, and each rank is an independent memory that provides the full data width of the memory module. Furthermore, the plurality of ranks in each memory module share a common data path for the memory module. The memory system also includes a hybrid interleaving mechanism which maps physical addresses to locations within memory modules and ranks so that: physical addresses for a given page all map to the same memory module; and physical addresses for the given page are interleaved across the plurality of ranks which comprise the same memory module.

For example, the hybrid-interleaving mechanism may be configured so that: a set of higher-order bits in a physical address, which exceed the page boundary in the physical address, are used to select a memory module; and a set of lower-order bits in a physical address, which are within the page boundary, are used to select a rank within the memory module. Furthermore, the hybrid interleaving mechanism may be configured so that a set of contiguous pages, which collectively equal the size of a memory module, map to the same memory module.

By not allowing a given page to be interleaved across multiple memory modules, the hybrid interleaving mechanism facilitates transitioning a memory module to a low power mode without creating address space holes which are smaller than a page size.

In some embodiments, the memory system includes a plurality of memory controllers, and the physical address bits which are used to select a memory controller are higher-order address bits, which exceed the page boundary in the physical address, so that the physical addresses in a given page all map to the same memory controller. Moreover, the hybrid interleaving mechanism may be configurable to accommodate: differing numbers of memory modules within the memory system; memory modules of different size; and/or ranks of different size. Additionally, the hybrid interleaving mechanism may be configurable to locate the higher- and lower-order physical address bits relative to different page boundaries in the physical address, so that the hybrid interleaving mechanism can accommodate different page sizes.

In some embodiments, the hybrid interleaving mechanism is configured to interleave: a first portion of the address space using a fine-grained interleave, which interleaves a given page across multiple memory modules; and a second portion of the address space using a coarse-grained interleave, which maps all physical addresses for a given page to the same memory module. For example, the first portion of the address space may be associated with a first processing node, and the second portion of the address space may be associated with a second processing node.

In some embodiments, the memory system resides within a multiprocessor which includes a plurality of processing nodes. Each processing node can be coupled to a plurality of memory controllers, and each memory controller can be coupled to a plurality of controller-to-memory channels. Furthermore, each controller-to-memory channel can be coupled to a plurality of memory modules, and each memory module can include a plurality of ranks.

In some embodiments, the plurality of memory modules includes a set of N memory modules. Furthermore the hybrid interleaving mechanism may map physical addresses to locations within memory modules and ranks so that: physical addresses for the given page all map to a given subset of M memory modules, where M<N; and physical addresses for the given page are interleaved across a plurality of ranks which comprise the given subset of M memory modules.

Figure 1A:
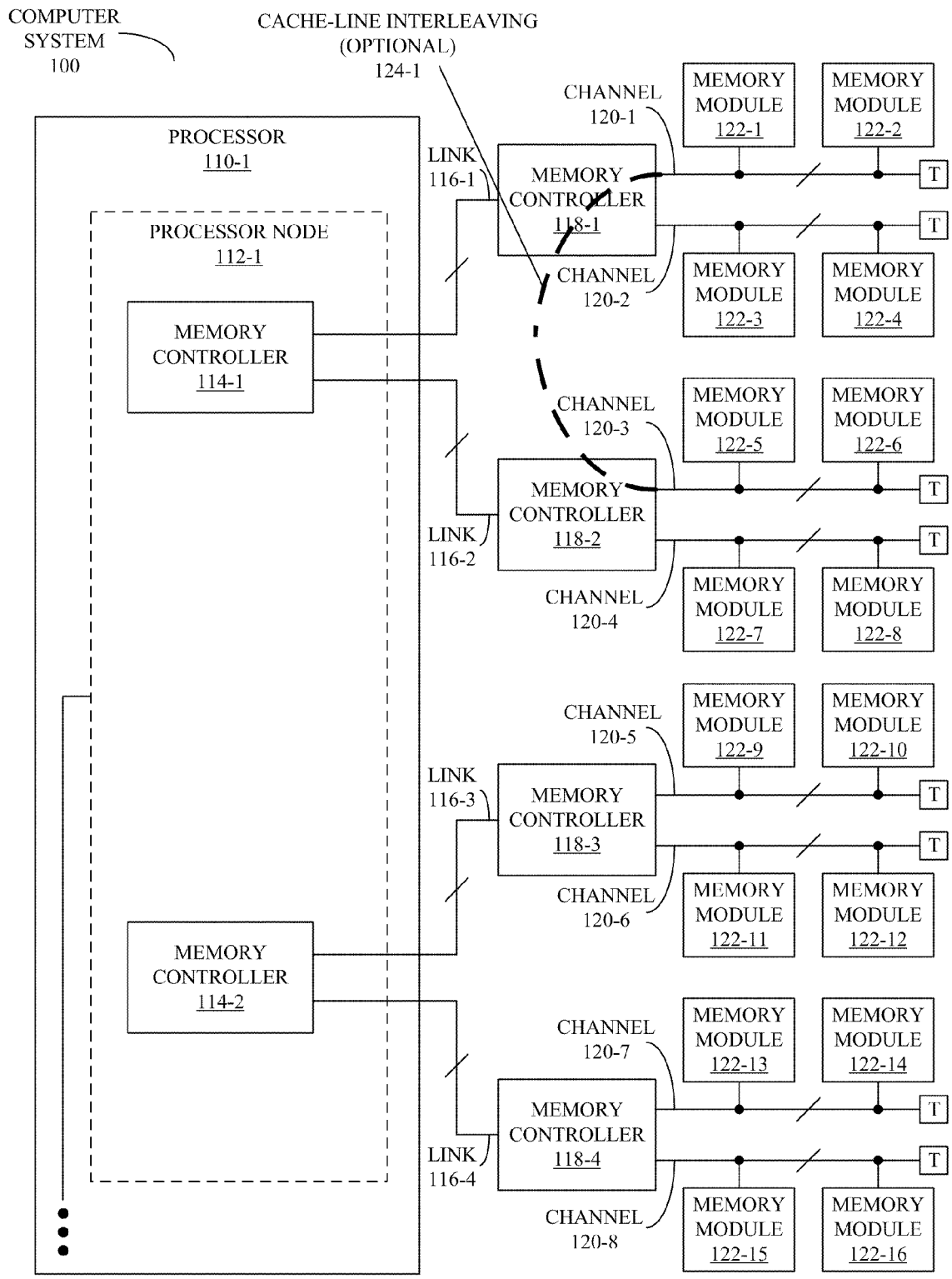
FIG. 1A is a block diagram illustrating a computer system in accordance with an embodiment of the present disclosure.

Table 1 illustrates physical address bits used in hybrid interleaving for different configurations of the computer system in FIG. 1A in accordance with an exemplary embodiment of the present disclosure.

Note that like reference numerals refer to corresponding parts throughout the drawings.

DETAILED DESCRIPTION

The following description is presented to enable any person skilled in the art to make and use the disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not intended to be limited to the embodiments shown, but is to be accorded the widest scope consistent with the principles and features disclosed herein.

Embodiments of a computer system, a memory system, and a hybrid interleaving method are described. This memory system includes a plurality of memory modules. Each memory module in the plurality of memory modules includes a plurality of ranks, and each rank is an independent memory that provides the full data width of the memory module. Furthermore, the plurality of ranks in each memory module share a common data path for the memory module. The memory system also includes a hybrid interleaving mechanism which maps physical addresses to locations within memory modules and ranks so that: physical addresses for a given page all map to the same memory module (or a same subset of the memory module); and physical addresses for the given page are interleaved across the plurality of ranks which comprise the same memory module.

This hybrid interleaving technique facilitates power management in the memory system. In particular, the hybrid interleaving technique may not allow a given page to be interleaved across multiple memory modules. As a consequence, a memory module (or a subset of a memory module, such as one or more ranks) can be transitioned to a low power mode without creating address space holes which are smaller than a page size. In addition, the use of the low-power mode may not significantly impact performance of the memory system because the hybrid interleaving technique may result in a throughput with a memory module that is between a lower throughput associated with interleaving the storage of the data across the memory modules based solely on a set of higher-order bits in a physical address, which exceed a page boundary in the physical address, and an upper throughput associated with interleaving the storage of the data in the ranks of the memory module based solely on a set of lower-order bits in the physical address, which are within the page boundary.

While the hybrid interleaving technique may be applied in a wide variety of systems and applications (including applications other than in a computer system), in the discussion that follows a computer system is used as an illustration. Furthermore, the hybrid interleaving technique may also be used with a wide variety of types of memory, including volatile memory and/or non-volatile memory, such as: ROM, RAM (such as DRAM), EPROM, EEPROM, flash, one or more smart cards, one or more magnetic disc storage devices, and/or one or more optical storage devices. In the discussion that follows, DRAM is used as an illustration.

We now describe embodiments of the computer system. FIG. 1A presents a block diagram illustrating a computer system 100. This computer system includes a processor 110-1 having multiple processor nodes, such as processor node 112-1. Processor node 112-1 includes two memory controllers 114, each of which is electrically coupled to a pair of memory controllers (such as memory controllers 118-1 and 118-2) by corresponding links 116 (such as links 116-1 and 116-2 or 116-3 and 116-4). In turn, each of memory controllers 118 is electrically coupled to one or more memory modules 122 by communication channels 120, which are optionally terminated by terminators (T). Note that processor nodes 114, links 116, memory controllers 118, communication channels 120 and/or memory modules 122 constitute a memory system in computer system 100.

Figure 1B:
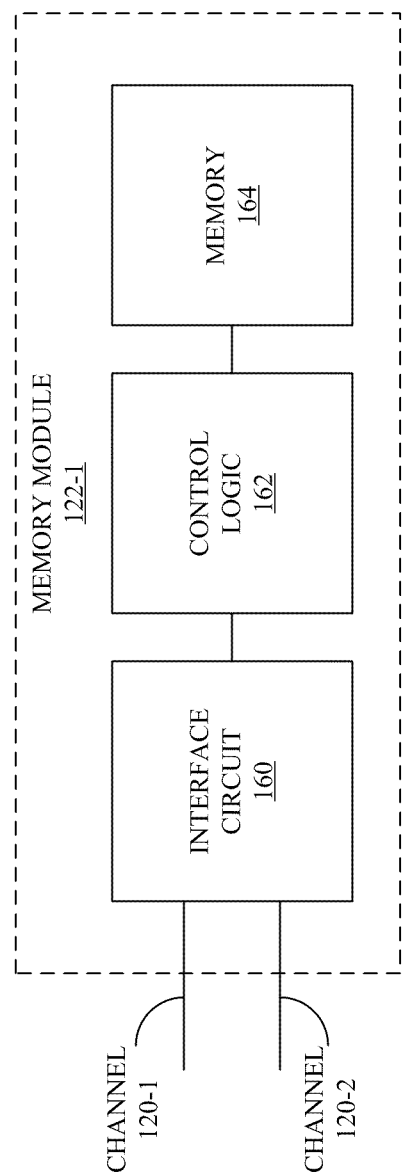
FIG. 1B is a block diagram illustrating a memory module in accordance with an embodiment of the present disclosure.

Moreover, each of memory controllers 118 includes interface circuits for receiving and transmitting the data, the physical address(es) and any associated commands. In addition, each of memory modules 122 includes interface circuits for receiving and transmitting the data, the physical address(es) and any associated commands, as well as control logic to implement the hybrid-interfacing techniques described below. For example, as shown in FIG. 1B (which presents a block diagram illustrating memory module 122-1), memory controller 122-1 may include interface circuit 160, control logic 162 and memory 164.

Referring back to FIG. 1A, in high-performance computer systems (such as servers), memory controllers 118 may implement an advanced memory buffer as a so-called buffer-on-board (BOB) for memory modules 122. Furthermore, each of memory modules 122 may be a dual-inline memory module, which includes DRAM having multiple ranks, and multiple banks within each rank. Each rank may be an independent memory that provides the full data width of each memory module, and the ranks in each memory module may share a common data path for the memory module. Additionally, communication with memory modules via communication channels 120 may occur on either or both clock edges, i.e., the communication may be double data rate.

As noted previously, fine-grained interleaving of data in memory modules 122 based on lower-order physical address bits (which are less than the page boundary in the physical address of the data) provides high throughput because words or cache lines in each page are distributed across memory modules 122. However, this interleaving technique makes it difficult to reduce power consumption by off-lining memory modules 122 without disrupting operation of the computer system because a hole within a physical page may occur. (Note that in order for the memory management system in computer system 100 to map from virtual addresses, which are used by the operating system and applications, to physical addresses, the address space needs to be contiguous for at least the page size.) On the other hand, coarse-grained interleaving of data in memory modules 122 based on higher-order address bits (which exceed the page boundary in the physical address of the data) allows ranks and/or memory modules 122 to be off-lined (i.e., placed in an inactive state) without creating a hole within a physical page, but typically reduces throughput (and, thus, performance of computer system 100) by as much as 30%.

To address this tradeoff between performance and power consumption, computer system 100 may use a hybrid interleaving technique. In this hybrid interleaving technique, a given memory controller (such as memory controller 118-1) may provide a physical address to memory modules (such as memory modules 122-1 through 122-4) during a memory operation, such as a load or store operation. This physical address may be associated with a given one of these memory modules (such as memory module 122-1). Using techniques known in the art, memory module 122-1 may match the physical address based on higher-order physical address bits, and memory module 122-1 may determine a location within memory module 122-1 based on lower-order physical address bits, and may load or store the data (for example, in memory 164 in FIG. 1B). Said differently, each of memory modules 122 (such as memory module 122-1) may implement a hybrid interleaving mechanism which maps physical addresses to locations within memory modules 122 and ranks so that: physical addresses for a given page all map to the same memory module (or, as discussed below with reference to FIG. 4, depending on how the address space is configured, a same subset of the same memory module); and physical addresses for the given page are interleaved across the plurality of ranks which comprise the same memory module (or the same subset of the same memory module). For example, the hybrid-interleaving mechanism may be configured so that: a set of higher-order bits in a physical address, which exceed the page boundary in the physical address, are used to select a memory module; and a set of lower-order bits in a physical address, which are within the page boundary, are used to select a rank within the memory module. Furthermore, the hybrid interleaving mechanism may be configured so that a set of contiguous pages, which collectively equal the size of memory module 122-1 (or the subset of memory module 122-1), map to the same memory module 122-1.

By using a combination of fine-grained interleaving within memory modules 122 and coarse-grained interleaving between memory modules 122 (i.e., by not allowing a given page to be interleaved across multiple memory modules), the hybrid interleaving mechanism facilitates transitioning one or more of memory modules 122 (or ranks within a given memory module) a low-power mode (i.e., off lined) without creating address space holes which are smaller than a page size. Moreover, words and pages can still be accessed with high throughput. Consequently, the hybrid interleaving technique provides more flexibility in selecting performance and power consumption during operation of computer system 100.

For example, each of memory modules 122 may have a total memory capacity of 8 GB, and may include four ranks (which each have a 2 GB memory capacity). A memory controller, such as memory controller 118-1, may receive a command including a physical address for a memory operation in one or more memory modules 122. Memory controller 118-1 may communicate the command to memory modules 122-1 through 122-4 via communication channels 120-1 and 120-2. In the address space in computer system 100, this physical address may be assigned to memory module 122-1. As noted previously, memory module 122-1 may identify the physical address based at least on one or more higher-order physical address bits, and may store the data at a location within the memory module 122-1 that is determined based at least on one or more lower-order physical address bits.

Figure 3:
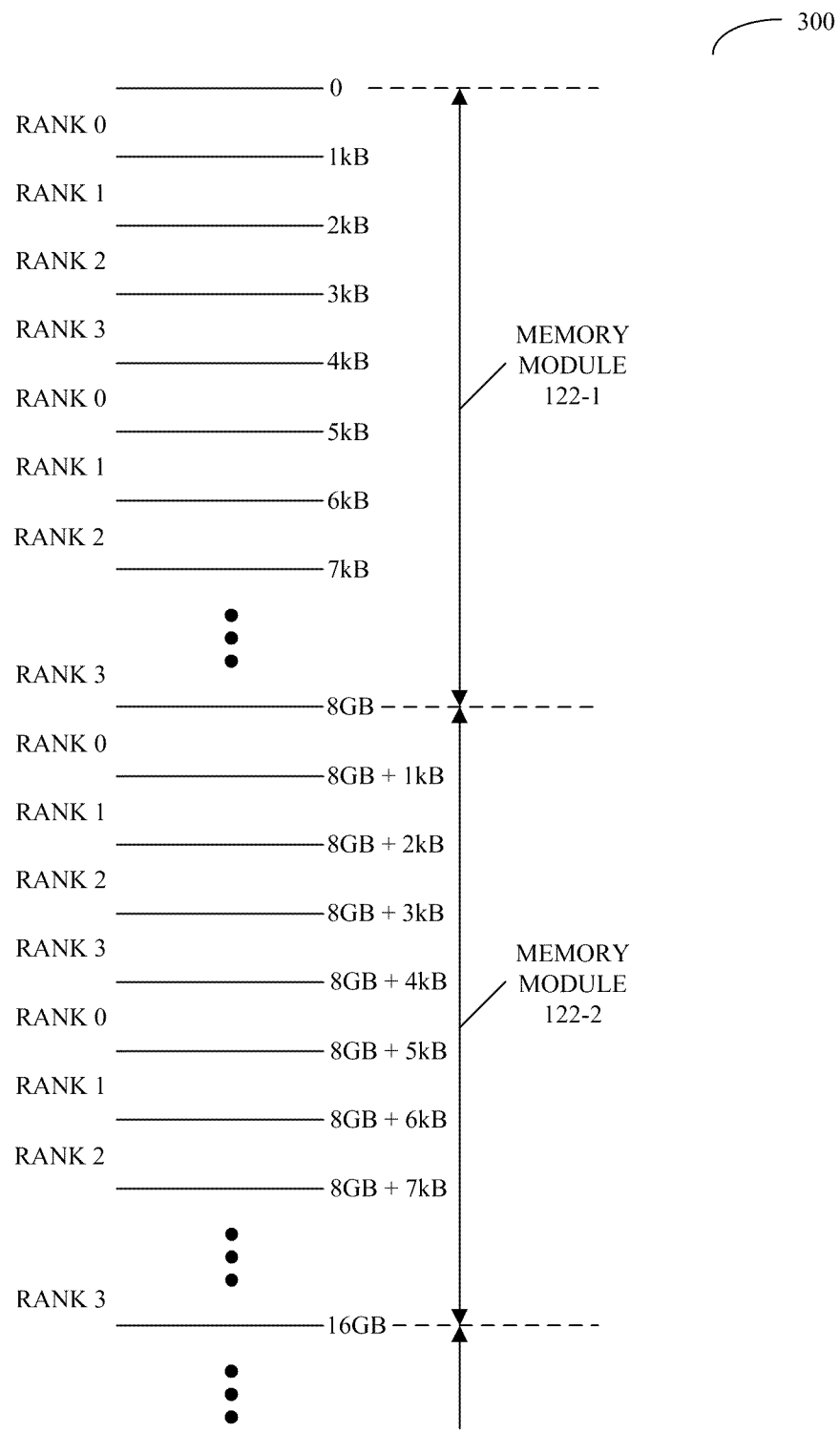
FIG. 3 is a block diagram illustrating storage of the data across the memory modules of FIG. 1A in accordance with an embodiment of the present disclosure.

As described further below with reference to FIGS. 3 and 4, groups of physical addresses in the address space may be associated with corresponding memory modules based at least on one or more physical address bits. Furthermore, for a given one of these groups, subsets of physical addresses may be associated with different portions of the corresponding memory module based at least on one or more lower-order physical address bits. For example, the different portions may include different ranks in the corresponding memory module.

In computer system 100, a block of data having associated physical addresses may be interleaved between memory modules 122 based at least on one or more higher-order physical address bits, and portions of the block of data may be interleaved within the given memory module based at least on one or more lower-order physical address bits. For example, the first 512 MB of a block of data may be associated with memory module 122-1, and a subsequent 512 MB may be associated with memory module 122-2, etc. One or more higher-order bits in the physical addresses of the block of data may be used by these memory modules to identify the data to be stored in these memory modules. Consequently, the one or more higher-order physical address bits may specify the granularity of the inter-memory module interleaving. Similarly, the one or more lower-order physical address bits may specify the granularity of the intra-memory-module interleaving. For example, subsets of the block of data associated with memory module 122-1 may be distributed among four ranks in memory module 122-1 based at least on one or more lower-order physical address bits (for example, in 2 KB blocks in a round-robin fashion among the ranks).

Therefore, fine-grained interleaving may be used within the given memory module. This hybrid interleaving technique ensures that a page of data (such as 4 or 8 KB) is distributed within the given memory module so that the given memory module can be off-lined to reduce power consumption without producing a hole in the address space within a page.

Computer system 100 may include additional interleaving at different levels of granularity to improve performance and to facilitate power management. For example, during a high-performance mode, portions of a block of data stored on memory module 122-1 in processor node 112-1 may alternate between a corresponding memory module in another processor node, thereby enabling interleaving at the memory-node level (which is sometimes referred to as memory-node interleaving). In some embodiments, this memory-node interleaving may be defined by a mask vector in computer system 100 as, for example, every 512 MB or 8 GB (or another value between these limits). (For example, 512 MB of the data may be stored in memory module 122-1 in a first processor node and a subsequent 512 MB may be stored in the corresponding memory module in a second processor node.) However, during a low-power mode of processor 110-1, one or more processor nodes 112 can be transitioned to an inactive state, in which case the memory-node interleaving may be disabled (for example, using the mask vector).

Similarly, processor nodes 112 may have a different number of memory controllers 114 and/or memory controllers 118 enabled based at least on performance requirements (i.e., during a low-power mode, one of memory controllers 114 and/or memory controllers 118 in processor node 112-1 may be in an inactive state). However, placing one or more of memory controllers 114 and/or memory controllers 118 in the inactive state may cause problems with the interleaving of a block of data either between memory controllers 114 or between memory controllers 118. For example, in an embodiment that is performing optional cache-line interleaving 124-1 between memory modules on communication channels 120-1 and 120-3, cache lines to consecutive physical address locations may be alternately stored in memory modules associated with memory controllers 118-1 and 118-2 in a 'ping-pong' fashion. While cache-line interleaving can provide good read and write performance, it may restrict the ability of embodiments that use this resolution of interleaving to place memory controllers 118 in the inactive state because the resolution of interleaving (e.g., 64 B cache lines) is smaller than the page size.

To address this problem, the mask vector may be used to provide a routing function for cache lines. Another option is to move the memory-controller cache-line interleave boundary to the page boundary. Note that for an 8 KB page, this is bit 13 in the physical address (PA13). In this case, for interleaving of cache lines between memory controllers 114 with one of memory-controllers 114 off-lined, alternate pages in the address space will be off-lined. However, the hole in the address space is at the page boundary which is manageable. Similarly, in some embodiments one of each pair of memory controllers (118-1 and 118-2 or 118-3 and 118-4) can be off-lined while leaving both of memory controllers 114 powered on. Said differently, cache lines can be interleaved using a single link to the active memory controller in each pair of memory controllers.

Another possibility is to cache-line interleave within a single communication channel (for example, only one of the two communication channels 120-1 and 120-2 from memory controller 118-1 may be active, so only alternate memory modules 122 may be active). This configuration is possible without creating unmanageable holes in the address space because of the hybrid interleaving.

Computer system 100 may include any of a variety of devices capable of manipulating computer-readable data, including: a personal computer, a laptop computer, a mainframe computer, a portable electronic device (such as a cellular phone or PDA), a server and/or a client computer (in a client-server architecture).

In some embodiments, computer system 100 and memory controllers 118 (such as memory controller 118-1 in FIG. 1B) include fewer or additional components. For example, computer system 100 may include multiple processors or processor cores that are disposed on a single integrated circuit or on multiple integrated circuits. Moreover, two or more components may be combined into a single component and/or a position of one or more components may be changed. Therefore, in some embodiments, memory controllers 118 are included in processor 110-1.

Note that while memory modules 122 in the preceding discussion have the same total memory capacity, in general memory modules with different total memory capacities than one another may be used in computer system 100. Furthermore, in other embodiments, the hybrid interleaving technique is applied to memory modules that do not include ranks.

with the memory operation (operation 210). Then, the given memory module determines if the physical address is in a group of physical addresses in an address space that are associated with the given memory module based at least on one or more higher-order physical address bits (operation 212). If yes, the given memory module loads or stores from a location within the given memory module based at least on one or more lower-order physical address bits (214). Afterwards, or if the memory module determines if the physical address is not in the group of physical addresses (operation 212), process 200 ends (operation 216).

In some embodiments of process 200 there may be additional or fewer operations. Moreover, the order of the operations may be changed and/or two or more operations may be combined into a single operation. Additionally, the preceding operations may be implemented using hardware and/or software, as is known in the art.

Table 1 provides physical address bits for use in exemplary embodiments of hybrid interleaving for different configurations of computer system 100 (FIG. 1A), which include different numbers of memory modules (MMs) that are arranged in ranks. In each of these configurations the following physical address bits (which are not shown in Table 1) perform the following functions: physical address bits PA[9:6] specify a bank within a rank, PA[30:18] specify a row address within that bank, and PA[5], PA[17:12] and PA[32] specify a column (col.) within that bank. Depending on the configuration, PA[11:10] specify the column and/or the rank, PA[31] specifies the row or the column, and PA[36:33] specify the memory module, the rank and/or the row. Using hybrid interleaving, in some configurations the rank is specified using PA[11:10] (i.e., fine-grained interleaving) while the memory module is specified using PA[35:33] (i.e., coarse-grained interleaving). In particular, in the examples in Table 1, each group or partition in the memory includes a single memory module (such that pages are spread within each memory module as opposed to across memory modules). Furthermore, these memory modules are selected using higher-order physical-address bits, while ranks within a given memory module are selected using lower-order physical-address bits.

TABLE 1

| No. of MMs | Ranks | Cap. Per Rank (GB) | Total Memory Cap. (GB) | PA 36 | PA 35 | PA 34 | PA 33 | PA 32 | PA 31 | PA 11 | PA 10 |
|---|---|---|---|---|---|---|---|---|---|---|---|
| 1 | 1 | 2 | 2 | | | | | Col. | Row | Col. | Col. |
| 2 | 1 | 2 | 4 | | | | MM | Col. | Row | Col. | Col. |
| 4 | 1 | 2 | 8 | | | MM | MM | Col. | Row | Col. | Col. |
| 1 | 2 | 2 | 4 | | | | Rank | Col. | Row | Col. | Col. |
| 2 | 2 | 2 | 8 | | | | Row | MM | Col. | Col. | Col. Rank |
| 4 | 2 | 2 | 16 | | Row | MM | MM | Col. | Col. | Col. | Rank |
| 4 | 4 | 2 | 32 | Row | MM | MM | Col. | Col. | Col. | Rank | Rank |

In these embodiments, a given subset of a block of data is assigned within a given memory module based at least on one or more lower-order physical address bits, and different subsets of the block of data are assigned to memory modules based at least on one or more higher-order physical address bits.

Figure 2:
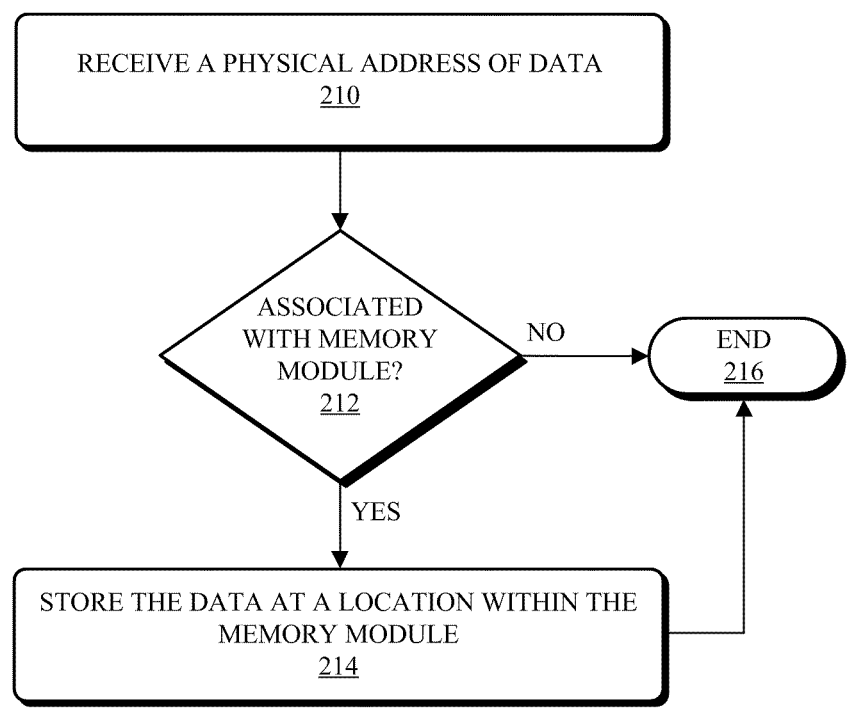
FIG. 2 is a flow chart illustrating a process for interleaving storage of data in one or more of the memory modules in FIG. 1A in accordance with an embodiment of the present disclosure.

We now describe embodiments of the hybrid interleaving technique. FIG. 2 presents a flow chart illustrating a process 200 for interleaving storage of data in one or more of memory modules 122 (FIG. 1A), which may be performed by the given memory module. During a memory operation, the given memory module receives a physical address associated FIG. 3 presents a block diagram 300 illustrating storage of a block of data in memory modules 122 (FIG. 1A). In this example, memory modules 122 in computer system 100 (FIG. 1A) each have a total memory capacity of 8 GB, which is divided into four 2 GB ranks. Moreover, each rank has eight banks (for a total of 32 banks per memory module). Fine-grained interleaving may be used to select among the four ranks of memory module 122-1. In particular, with an 8 KB page size, PA[13:10] may be used to specify ranks in increments of 1, 2, 4 or 8 KB. Thus, an 8 KB page may be distributed over banks/ranks in 1 KB blocks within memory module 122-1.

This configuration provides good performance within the 8 GB of total memory capacity in memory module 122-1, and distributes the data across memory modules 122. This allows one or more of memory modules 122 to be off-lined as needed without generating a hole in the address space that is smaller than the page size. For example, if memory module 122-3 is off-lined, there will be as much as an 8 GB 'hole' in the address space, including multiple pages. However, these pages align with the boundaries of this 8 GB region, which makes it easier to manage (by simply skipping to the next 8 GB contiguous group of physical addresses associated with an active memory module), because the hole does not encompass only a portion of a given page so the operating system will not crash.

Note that, for blocks of data, the throughput of the given memory module in the hybrid interleaving technique may be between the throughputs associated with coarse-grained interleaving (based solely on higher-order physical address bits) and fine-grained interleaving (based solely on lower-order physical address bits). Thus, the hybrid interleaving technique may provide an acceptable compromise when optimizing power consumption and performance in computer system 100 (FIG. 1A). For example, if only fine-grained interleaving is used in the preceding example, each 8 KB page can be distributed over the 128 banks in the four memory modules 122-1 through 122-4. However, if only coarse-grained interleaving is used in the preceding example, the first 2 GB in a block of data may be stored in rank 0 of memory module 122-1, the next 2 GB may be stored in rank 1 of memory module 122-1, etc. Therefore, each 8 KB page is distributed over the 8 banks in one of the ranks (and the throughput is 16 times smaller than with fine-grained interleaving).

In the case of hybrid interleaving of a block of data (illustrated in FIG. 3), 0-1 KB goes to rank 0 in memory module 122-1, 1-2 KB goes to rank 1 in memory module 122-1, 2-3 KB goes to rank 2 in memory module 122-1, 3-4 KB goes to rank 3 in memory module 122-1, 4-5 KB goes to rank 0 in memory module 122-1, etc. When at 8 GB–8 GB+1 KB in address space, memory module 122-2 is used and the fine-grained interleaving process is repeated. Because each of the ranks has 8 banks in this example, 32 banks in each memory module are available for throughput.

As noted previously, physical addresses associated with different portions of the address space in computer system 100 (FIG. 1A) may be associated with a different granularity for the transition from fine-grained interleaving to coarse-grained interleaving.

Figure 4:
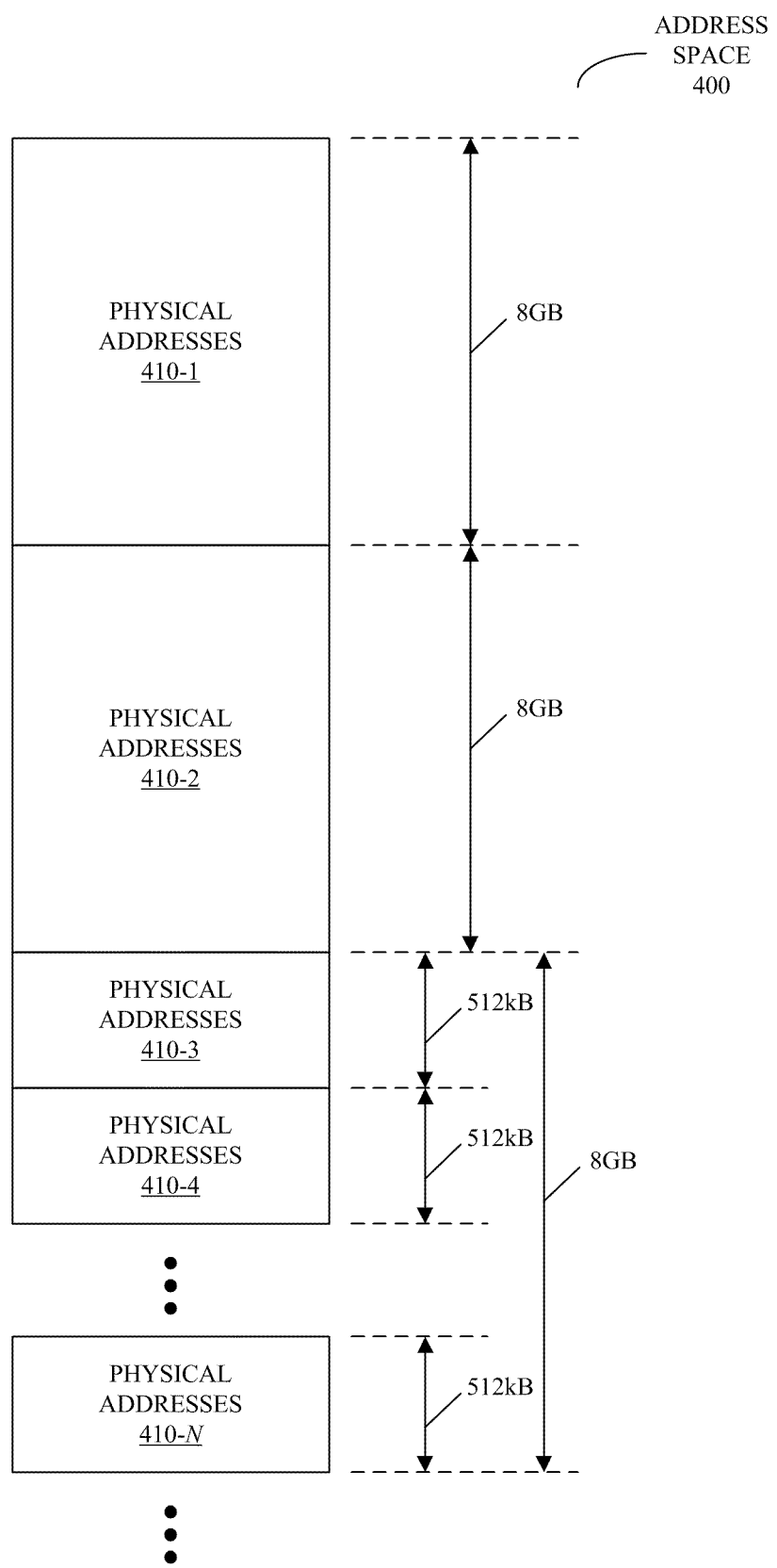
FIG. 4 is a block diagram illustrating an address space in accordance with an embodiment of the present disclosure.

This is shown in FIG. 4, which presents a block diagram illustrating an address space 400. Address space 400 is configured so that groups of contiguous physical addresses 410-1 and 410-2 are associated with coarse-grained interleaving. In contrast, groups of contiguous physical addresses 410-3 through 410-N are associated with fine-grained interleaving.

However, the configuration of address space 400 may be adapted and modified as needed using the mask vector. Thus, physical addresses corresponding to 0-4 GB in address space 400 can use 512 MB interleave, physical addresses corresponding to 4-12 GB in address space 400 can use 8 GB interleave, physical addresses corresponding to 12-16 GB in address space 400 can use 512 MB interleave, etc. This configurability of the interleaving in address space 400 allows a given memory module to be off-lined, thereby providing additional options for optimizing power and performance in computer system 100 (FIG. 1A). More generally, by providing different levels of parallelism in different portions of address space 400, different processor nodes 112 (FIG. 1A) in computer system 100 (FIG. 1A) can have different configurations for performance and power consumption.

Note that memory modules 122 (FIG. 1A) may be modified and/or adapted as needed to accommodate re-configuration of address space 400 using techniques known in the art.

In some embodiments, a first portion of address space 400 is associated with a first processing node (such as processing node 112-1 in FIG. 1A), and the second portion of address space 400 may be associated with a second processing node (not shown in FIG. 1A). Furthermore, in embodiments where a memory system (such as the memory system shown in computer system 100 in FIG. 1A) includes multiple memory controllers 114 (FIG. 1A), the physical address bits which are used to select a memory controller (such as memory controller 114-1 in FIG. 1) may be higher-order address bits, which exceed the page boundary in the physical address, so that the physical addresses in a given page all map to the same memory controller. Moreover, address space 400 and the hybrid interleaving mechanism in memory modules 122 (FIG. 1A) may be configurable to accommodate: differing numbers of memory modules 122 (FIG. 1A) within the memory system; memory modules 122 (FIG. 1A) of different size; and/or ranks of different size. Additionally, address space 400 and the hybrid interleaving mechanism in memory modules 122 (FIG. 1A) may be configurable to locate the higher- and lower-order address bits relative to different page boundaries in the physical address, so that the hybrid interleaving mechanism can accommodate different page sizes.

In some embodiments, pages are spread either among the ranks of a single memory module and/or among the ranks of M memory modules out of N total memory modules on a memory channel (i.e., M is less than or equal to N) if the number of ranks on a memory channel N·R equals $2^I$, where R is the number of ranks per memory module, there are N memory modules, and I is an integer (however, as described further below, the hybrid interleaving may be used if the sum of all of the ranks in a partition equals $2^I$). In this example, it is assumed that each memory module has the same number of ranks. Consequently, pages can be spread among $M_1$ memory modules and $N-M_1$ memory modules as long as $M_1 \cdot R$ and $(N-M_1) \cdot R$ are both $2^I$. Note that this restricts the number of ranks on each memory module. For example, with N equal to 8, $M_1$ equal to 1 (i.e., $2^0$), $N-M_1$ equals 7 (which is not $2^I$). Consequently, this example does not work for typical values of R (such as 1, 2, 4, etc.) because $N-M_1$ does not equal to be $2^I$. In contrast, with N equal to 8, $M_1$ equal to 4 (i.e., $2^0$), and $N-M_1$ equal to 4, R equal to 1, 2, 4, etc. would all work. Therefore, the selection of $M_1$ may need to ensure that, for a given N, the combinations of R equal to 1, 2, 4, 8, etc. (i.e., the number of ranks per memory module) work for selecting the group of memory modules to distribute the pages using fine-grained PA bits. While preceding embodiments illustrate two partitions, this technique can be expanded to P partitions if P is a power of 2, and the number of ranks in each partition is a (possibly different) power of 2.

By using higher-order physical-address bits to select the memory module and lower-order physical-address bits to select the ranks, some pages can be distributed across $M_1$ memory modules and the remainder can be distributed across $N-M_1$ memory modules (where $M_1$ is less than or equal to N). For example, if $M_1$ equals 2 and N equals 4, one page will be distributed across two memory modules. Furthermore, if each of these memory modules has R ranks, the rank can be specified using lower-order physical address bits. In this example, the $M_1$ memory modules can be selected using higher-order physical address bits, but memory modules and ranks within the $M_1$ memory modules can be selected using lower-order physical-address bits. Thus, for $M_1$ equal 2, the group of two memory modules may be selected using higher-order physical address bits, but the second memory module within $M_1$, as well as all of the ranks within these two memory modules, may be selected using lower-order physical-address bits.

Similarly, if $N-M_1$ equals 2, these memory modules can be selected as a group using higher-order physical address bits, and memory modules and ranks within the group can be selected using lower-order physical-address bits. While the preceding discussion illustrated a two-way partition of N memory modules ($M_1$ and $N-M_1$), it is possible to have n partitions so that $X_1+X_2+\ldots+X_n$ equals N memory partitions on a memory channel, where $X_n$ is the Nth memory partition, and where $X_n$ includes $K_n$ memory modules. Each of the $K_n$ memory modules of the $X_n$ memory partition may have $R_n$ ranks. For each memory partition $X_n$, the product of $K_n$ and $R_n$ may equal $2^I$ in order for a page to be distributed. With four memory partitions, where each memory partition has two memory modules, each of the memory modules may have 1, 2, 4 or 8 ranks. Thus, in the $X_1, X_2, X_3, X_4$ memory partitions, $K_1, K_2, K_3$, and $K_4$ each equal two, and $R_1$ may equal two, $R_2$ may equal one, $R_3$ may equal eight, and $R_4$ may equal four. Because $K_1 \cdot R_1$ equals $X_1$, a set of pages can be distributed across the two memory modules and the four ranks cumulatively in this subset or partition (in particular, $K_1 \cdot R_1$ equals 2·2 or four, which equals $2^I$, with I equal to two). Similarly, because $K_2 \cdot R_2$ equals $2^I$, with I equal to one, a set of pages can be distributed across the two memory modules and the two ranks cumulatively in this subset or partition. Furthermore, because $K_3 \cdot R_3$ equals $2^I$, with I equal to four, a set of pages can be distributed across the two memory modules and the 16 ranks cumulatively in this subset or partition. Additionally, because $K_4 \cdot R_4$ equals $2^I$, with I equal to three, a set of pages can be distributed across the two memory modules and the eight ranks cumulatively in this subset or partition.

Note that $K_1 \cdot R_1 + K_2 \cdot R_2 + K_3 \cdot R_3 + K_4 \cdot R_4$ equals 30, which is not equal to $2^I$. However, the hybrid-interleaving technique will work because there are four sets of pages that are distributed across the four memory partitions ($X_1, X_2, X_3, X_4$), each of which satisfying $K_n \cdot R_n$ equal to $2^I$. Therefore, a first set of pages may reside in the $X_1$ partition, a second set of pages may reside in the $X_2$ partition, etc., and a given partition may be selected using high-order physical-address bits, while the memory modules and ranks within the given partition may be selected using lower-order physical-address bits. This and the previous embodiments of the hybrid-interleaving technique allow the memory partitions to be off-lined (and, thus, associated memory modules in those memory partitions that include more than one memory module).

The foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art. Additionally, the above disclosure is not intended to limit the present disclosure. The scope of the present disclosure is defined by the appended claims.

What is claimed is:

1. A memory system, comprising:
   a set of N memory modules, wherein each memory module in the set of N memory modules includes a plurality of ranks, wherein each rank is an independent memory that provides the full data width of the memory module, and wherein the plurality of ranks in each memory module share a common data path for the memory module; and
   a hybrid interleaving mechanism which maps physical addresses to locations within memory modules and ranks so that,
   physical addresses for a given page all map to a given subset of M memory modules, wherein M<N, and
   physical addresses for the given page are interleaved across a plurality of ranks which comprise the given subset of M memory modules,
   wherein the hybrid interleaving mechanism is configured to:
      for a given physical address in the physical addresses, use a first set of bits in the physical address to select a given memory module in the M memory modules and a second set of bits in the physical address to select a rank within the given memory module; and
      at least one of use the first set of bits to specify a granularity for an inter-memory-module interleaving of the given page between the M memory modules and use the second set of bits to specify a granularity for an intra-memory-module interleaving for at least a portion of the given page that is interleaved across ranks of a memory module corresponding to the first set of bits.

2. The memory system of claim 1, wherein the hybrid-interleaving mechanism is configured so that:
   the first set of bits comprises a set of higher-order bits in the given physical address, which exceed a page boundary in the physical address, and which are used to select the given subset of M memory modules; and
   the second set of bits comprises a set of lower-order bits in the given physical address, which are within the page boundary, and which are used to select a rank within the given subset of M memory modules.

3. The memory system of claim 1, wherein the hybrid interleaving mechanism is configured so that a set of contiguous pages, which collectively equal the size of the given subset of M memory modules, map to the given subset of M memory modules.

4. The memory system of claim 1, wherein the memory system includes a plurality of memory controllers; and
   wherein the physical address bits which are used to select a memory controller are higher-order address bits, which exceed a page boundary in the physical address, so that the physical addresses in a given page all map to the same memory controller.

5. The memory system of claim 4, wherein the hybrid interleaving mechanism is configurable to accommodate:
   differing numbers of memory modules within the memory system;
   memory modules of different size; and
   ranks of different size.

6. The memory system of claim 5, wherein the hybrid interleaving mechanism is configurable to locate the higher- and lower-order physical address bits relative to different page boundaries in the physical address, so that the hybrid interleaving mechanism can accommodate different page sizes.

7. The memory system of claim 1, wherein the first portion of the address space is associated with a first processing node; and
   wherein the second portion of the address space is associated with a second processing node.

8. The memory system of claim 1, wherein the memory system resides within a multiprocessor which includes:
   a plurality of processing nodes, wherein each processing node can be coupled to a plurality of memory controllers;

wherein each memory controller can be coupled to a plurality of controller-to-memory channels;
wherein each controller-to-memory channel can be coupled to a plurality of memory modules; and
wherein each memory module can include a plurality of ranks.

9. A memory system, comprising:
a plurality of memory modules, wherein each memory module in the plurality of memory modules includes a plurality of ranks, wherein each rank is an independent memory that provides the full data width of the memory module, and wherein the plurality of ranks in each memory module share a common data path for the memory module; and
a hybrid interleaving mechanism which maps physical addresses to locations within memory modules and ranks so that,
physical addresses for a given page all map to the same memory module, and
physical addresses for the given page are interleaved across the plurality of ranks which comprise the same memory module,
wherein the hybrid interleaving mechanism is configured to:
for a given physical address in the physical addresses, use a first set of bits in the physical address to select the same memory module and a second set of bits in the physical address to select a rank within the plurality of ranks; and
use the second set of bits to specify a granularity for an intra-memory-module interleaving for the physical addresses for the given page that are interleaved across the plurality of ranks.

10. The memory system of claim 9, wherein the hybrid-interleaving mechanism is configured so that:
the first set of bits comprises a set of higher-order bits in the given physical address, which exceed a page boundary in the physical address, and which are used to select a memory module; and
the second set of bits comprises a set of lower-order bits in a physical address, which are within the page boundary, and which are used to select a rank within the memory module.

11. The memory system of claim 9, wherein by not allowing a given page to be interleaved across multiple memory modules, the hybrid interleaving mechanism facilitates transitioning a memory module to a low power mode without creating address space holes which are smaller than a page size.

12. The memory system of claim 9, wherein the hybrid interleaving mechanism is configured so that a set of contiguous pages, which collectively equal the size of a memory module, map to the same memory module.

13. The memory system of claim 9, wherein the memory system includes a plurality of memory controllers; and
wherein the physical address bits which are used to select a memory controller are higher-order address bits, which exceed a page boundary in the physical address, so that the physical addresses in a given page all map to the same memory controller.

14. The memory system of claim 13, wherein the hybrid interleaving mechanism is configurable to accommodate:
differing numbers of memory modules within the memory system;
memory modules of different size; and
ranks of different size.

15. The memory system of claim 14, wherein the hybrid interleaving mechanism is configurable to locate the higher- and lower-order physical address bits relative to different page boundaries in the physical address, so that the hybrid interleaving mechanism can accommodate different page sizes.

16. The memory system of claim 9, wherein the first portion of the address space is associated with a first processing node; and
wherein the second portion of the address space is associated with a second processing node.

17. The memory system of claim 9, wherein the memory system resides within a multiprocessor which includes:
a plurality of processing nodes, wherein each processing node can be coupled to a plurality of memory controllers;
wherein each memory controller can be coupled to a plurality of controller-to-memory channels;
wherein each controller-to-memory channel can be coupled to a plurality of memory modules; and
wherein each memory module can include a plurality of ranks.

18. A computer system, comprising:
a least one processing node;
at least one memory controller coupled to the at least one processing node;
a plurality of memory modules coupled to the at least one memory controller, wherein each memory module in the plurality of memory modules includes a plurality of ranks, wherein each rank is an independent memory that provides the full data width of the memory module, and wherein the plurality of ranks in each memory module share a common data path for the memory module; and
a hybrid interleaving mechanism which maps physical addresses to locations within memory modules and ranks so that,
physical addresses for a given page all map to the same memory module, and
physical addresses for the given page are interleaved across the plurality of ranks which comprise the same memory module,
wherein the hybrid interleaving mechanism is configured to:
for a given physical address in the physical addresses, use a first set of bits in the physical address to select the same memory module and a second set of bits in the physical address to select a rank within the plurality of ranks; and
use the second set of bits to specify a granularity for an intra-memory-module interleaving for the physical addresses for the given page that are interleaved across the plurality of ranks.

19. The memory system of claim 1, wherein the hybrid interleaving mechanism is configured to interleave:
a first portion of the address space using a fine-grained interleave, which interleaves a given page across all M memory modules in the given subset of M memory modules; and
a second portion of the address space using a coarse-grained interleave, which maps all physical addresses for a given page to the given subset of M memory modules.

20. The memory system of claim 9, wherein the hybrid interleaving mechanism is configured to interleave:
a first portion of the address space using a fine-grained interleave, which interleaves a given page across multiple memory modules; and a second portion of the address space using a coarse-grained interleave, which maps all physical addresses for a given page to the same memory module.

\* \* \* \* \*

UNITED STATES PATENT AND TRADEMARK OFFICE
CERTIFICATE OF CORRECTION

PATENT NO.       : 8,819,359 B2                                Page 1 of 1
APPLICATION NO.  : 12/493455
DATED            : August 26, 2014
INVENTOR(S)      : Kapil et al.

It is certified that error appears in the above-identified patent and that said Letters Patent is hereby corrected as shown below:

In the Claims

In column 12, line 16, delete "at least one of use the first set of bits" and insert -- use the first set of bits --, therefor.

Signed and Sealed this
Seventh Day of July, 2015

Michelle K. Lee
*Director of the United States Patent and Trademark Office*